United States Patent
Agarwal

[19]

[11] Patent Number: 5,850,264
[45] Date of Patent: Dec. 15, 1998

[54] PSEUDO INTERLACING IN DIGITAL VIDEO

[75] Inventor: Rohit Agarwal, Hillsboro, Oreg.

[73] Assignee: Intel Corporation, Santa Clara, Calif.

[21] Appl. No.: 575,175

[22] Filed: Dec. 19, 1995

Related U.S. Application Data

[63] Continuation of Ser. No. 268,961, Jun. 30, 1994, abandoned.
[51] Int. Cl.$^6$ .................................................. H04N 7/26
[52] U.S. Cl. .......................... 348/469; 348/439; 348/448; 348/459
[58] Field of Search ..................... 348/439, 426, 348/384, 22, 440, 446, 448, 458, 459, 469; H04N 7/26

[56] References Cited

U.S. PATENT DOCUMENTS

| | | | |
|---|---|---|---|
| 3,715,483 | 2/1973 | Limb et al. ............................. | 348/412 |
| 4,060,832 | 11/1977 | Devimeux et al. ..................... | 348/439 |
| 4,620,225 | 10/1986 | Wendland et al. ..................... | 348/439 |
| 4,984,082 | 1/1991 | Okamura ................................ | 348/567 |
| 5,072,296 | 12/1991 | Lim ........................................ | 348/459 |
| 5,146,325 | 9/1992 | Ng ......................................... | 348/439 |
| 5,174,641 | 12/1992 | Lim ........................................ | 348/427 |
| 5,253,058 | 10/1993 | Gharavi .................................. | 348/409 |
| 5,384,598 | 1/1995 | Rodriguez et al. .................... | 348/426 |

*Primary Examiner*—Glenton B. Burgess
*Attorney, Agent, or Firm*—Duane, Morris & Heckscher LLP

[57] ABSTRACT

Sequential digital video frames are divided into two interleaved fields comprising even-numbered horizontal lines of pixels and odd-numbered lines horizontal lines of pixels respectively. The "even" field of a first standard frame is combined with the "odd" field of a second standard frame to form a first pseudo-interlaced frame of data for display; then the same odd field is combined with the even field of a third standard frame to form a second pseudo-interlaced frame of data for display, and so on throughout a continuing digital-video message. The data transmission rate needed is thus reduced by nearly a factor of two, or conversely, for a given data rate, nearly twice as much video information can be transmitted in the same time interval.

26 Claims, 6 Drawing Sheets

PSEUDO INTERLACING IN DIGITAL VIDEO

This application is a continuation of application Ser. No. 08/268,961 filed on Jun. 30, 1994 now abandoned.

BACKGROUND OF THE INVENTION

This invention relates to digital video transmission systems, and, more particularly, to techniques for accomplishing increased efficiency of digital video image transmissions.

The original analog technique used for video image transmission and display comprised sweeping an amplitude-modulated electron beam across a video screen at a standard repetition rate and doing a fixed number of such sweeps per image frame using a "roster scanning" approach. In order to accomplish such roster scanning on a screen of moderate size (e.g. 14" wide by 12" high) using a standards 525 horizontal lines per frame, while "refreshing" the screen at a rate of 60 frames per second it would have required an excessive frequency bandwidth for the video signal. In order to deal with this problem the technique of "interlacing" was introduced. Using this approach, the even and odd horizontal lines are alternately refreshed as even and odd frames, each at a rate of 30 frames per second. The human eye effectively integrates the overlap in a manner that "tricks" the human viewer into apparently seeing the entire screen being refreshed 60 times per second. Actually, though, the eye is seeing only 30 even frames and 30 odd frames alternately each second. This allows for a reduction of the required video signal bandwidth by a factor of two.

The digital video industry in North America and Japan currently has a standard for "Full Motion Video" of 30 frames per second. This rate gives moderately good results except for fast movement of the subject. In digital video, the entire screen is normally refreshed at this rate, and the frame is not broken up into separate fields.

SUMMARY OF THE INVENTION

Applicant has discovered a novel technique for producing a sequence of digital video images at the standard full motion video refresh rate which results in an acceptable moving image on a video screen for a relatively slow-moving subject, while at the same time reducing the amount of digital data that must be processed. The technique employs "pseudo-interlacing" of the digital video data as follows: all even horizontal lines of pixel data of a first full original frame of displayed digital data are combined with all odd horizontal lines of pixel data intended for displaying a second full original frame of pixel data immediately following the first full frame to create a first new pseudo-interlaced frame for processing and subsequent display. A second new pseudo-interlaced frame is produced similarly by combining the above-mentioned odd horizontal lines with the even horizontal lines of pixel data intended for display of a third full original frame. This process is continued in an even-odd, odd-even sequence throughout the entire set of original digital video data.

Use of the above-described pseudo-interlacing reduces by almost half the amount of digital video data that must be processed and transmitted or stored. This due to the fact that for any given full original frame of pixel data only one-half of the data (i.e. either the odd or even lines thereof) are encoded for transmission. Upon reception the data is reconstructed into full frames wherein each frame gets one-half of its data (i.e. either the odd or even lines) from its immediately-preceding frame. The reconstructed data is then displayed as full frames at the full motion video refresh rate. The resulting video image is not significantly degraded as long as the motion of the subject is relatively slow (as, for instance, is normally the case in digital video teleconferencing).

DETAILED DESCRIPTION

Figure 1:
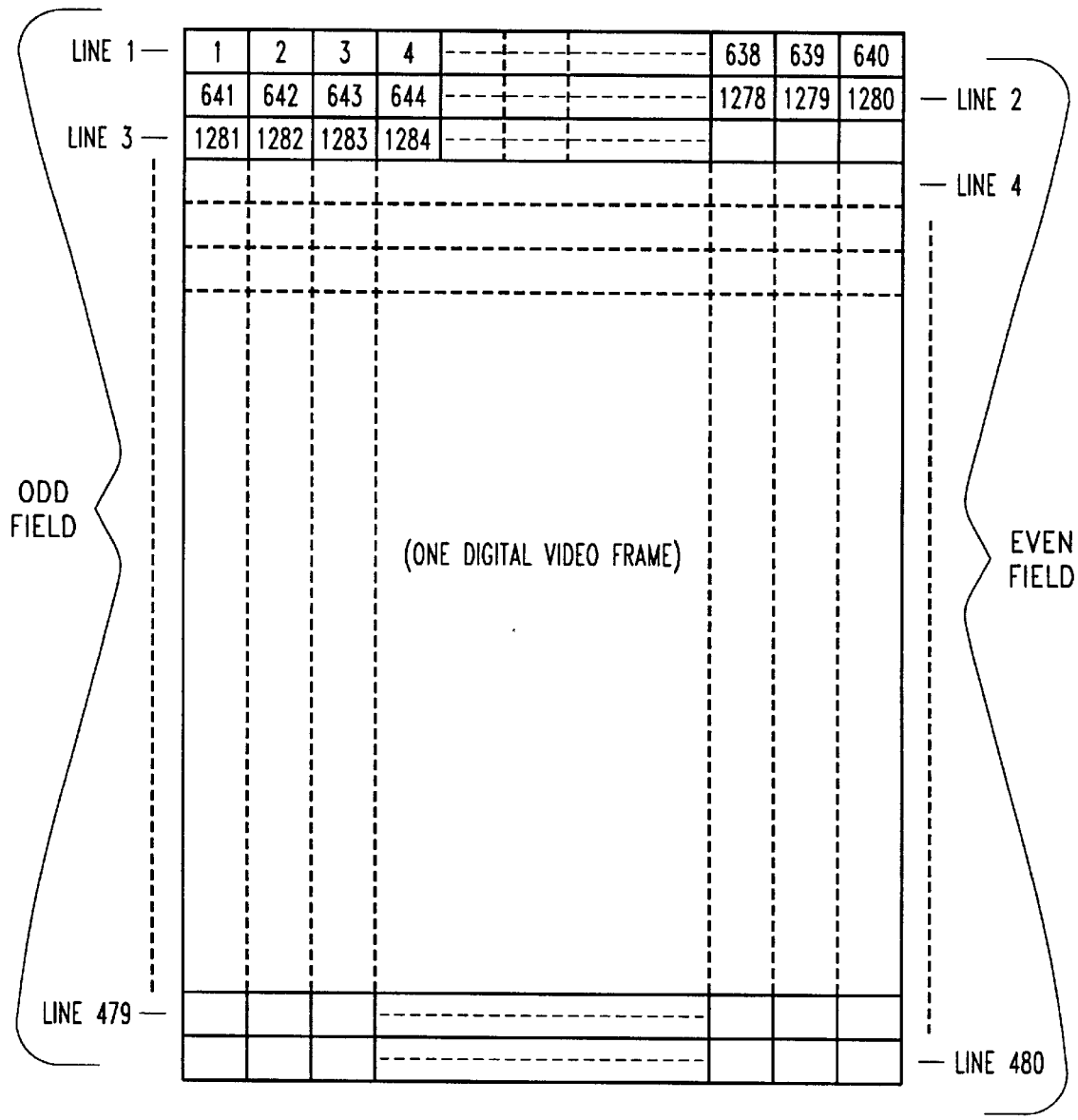
FIG. 1 shows a typical digital video frame.

In a preferred embodiment of the digital video transmission system of the instant invention, each full frame of original digital video data is divided into two separate fields of data as depicted in FIG. 1. The "even" field consists of even-numbered lines 2 through 480, and the "odd" field consists of odd numbered lines 1 through 479. Each line is divided into 640 separate pixels as shown, yielding a total of 307,200 total pixels per frame. Each full-sampled color-encoded YUV pixel requires 24 binary bits of information, yielding a total of 7,372,800 binary bits per frame. At a frame refresh rate of 30 frames per second, this amounts to a mind-boggling real-time processing rate of 221,184,000 binary bits per second! This is prohibitively high, even with the most-advanced Intel Inside® systems currently available. There exist many approximation or "compression" techniques for reducing this rate in practical applications, such as truncation, run-length ("RL") coding, color subsampling, color lookup tables ("CLUT"), and discrete transforms.

The instant invention comprises a novel approach to reduce the above-mentioned real-time processing rate by approximately a factor of two. When used in conjunction with some or all of the currently-available compression techniques, very large reductions in the required processing rate can be accomplished while at the same time maintaining good picture quality. These various techniques, used to extreme, tend to produce distinctive corresponding characteristic "artifacts" (i.e. picture degradations) such as pixelation, contouring, and blurring. But, if each is used in moderation and in combination with the others, they can produce a good quality picture which is substantially free of humanly-visible artifacts. The instant invention, for instance, results in a moving image that is apparently free of artifacts unless the subject moves quickly. A sudden motion by the subject can result in a perceptible jaggedness of non-horizontal transition lines in the video image. But, for a slow-moving subject, no such artifacts are observed. So, at least for certain applications, the technique of this invention provides a major benefit with little or no perceptible tradeoff in image quality.

Figure 2:
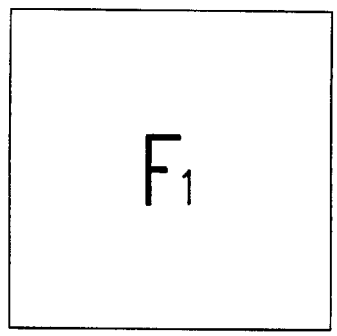
FIG. 2 depicts the systematic scheme used for discarding partial frames.
Figure 2:
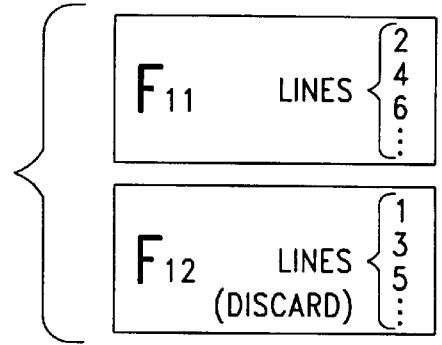
Figure 2:
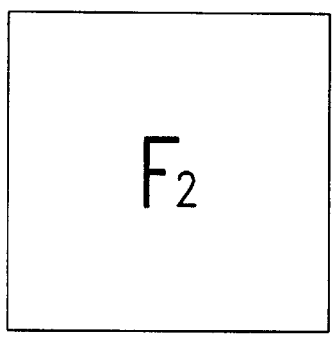
Figure 2:
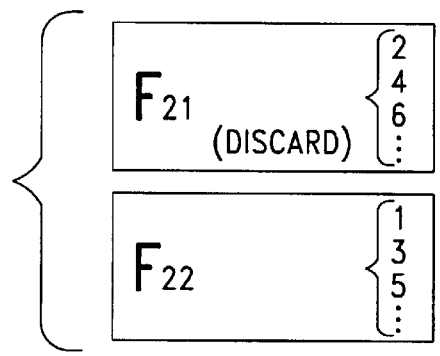
Figure 2:
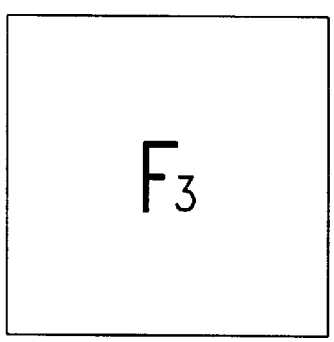
Figure 2:
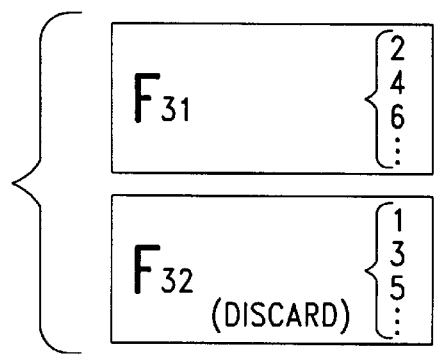
Figure 2:
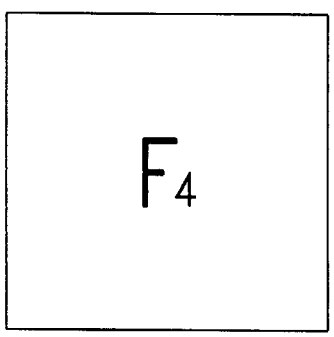
Figure 2:
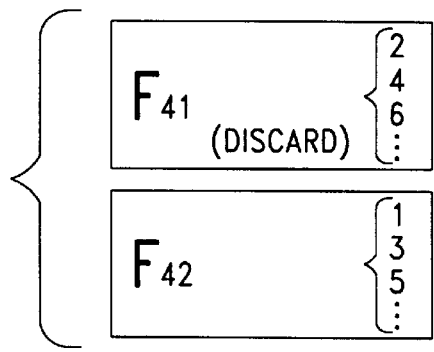
Figure 3A:
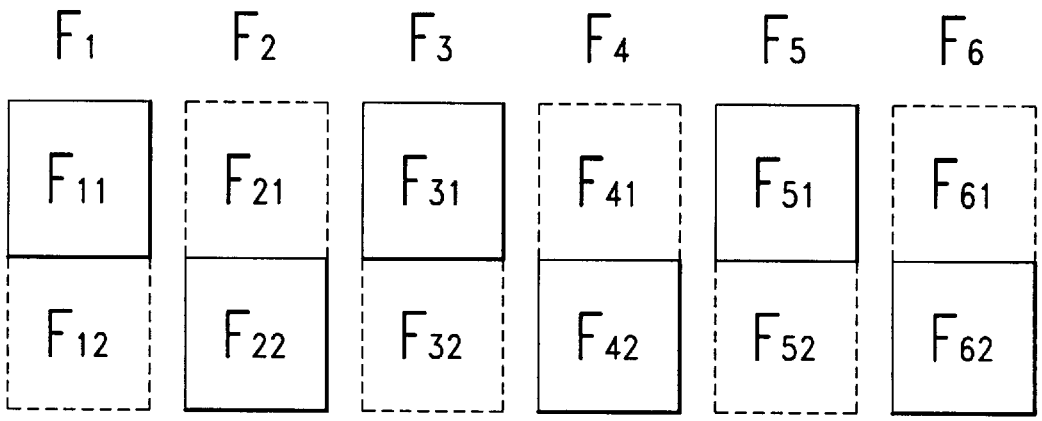
FIG. 3(a) shows the preferred pattern for encoding a "half-and half" implementation of the invention.
Figure 3B:
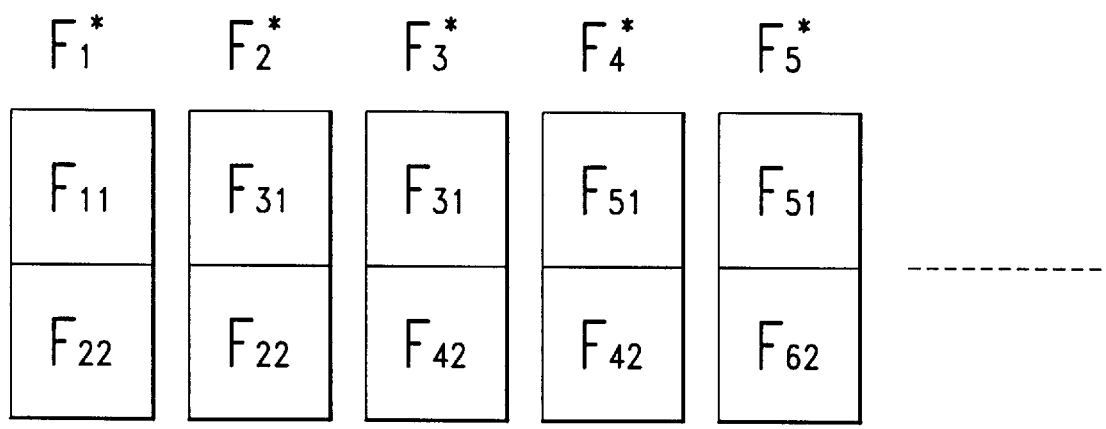
FIG. 3(b) clarifies one way to synthesize a displayable video image using pseudo-interlacing.

By referring again to FIG. 1, in conjunction with FIGS. 2, 3(a), and 3(b), basic concept of this invention can be readily gleaned. The odd and even fields of the sequential video frames are alternately digitally encoded. This entails encoding one-half as much pixel data as is available from the original video source. As shown in FIG. 2, half of the originally-available video data is discarded in a regular sequential pattern before the digital encoding is implemented. This concept is also depicted in FIG. 3(a) wherein the information in the dotted-line odd and even half frames is not encoded for transmission. One might be inclined to conclude that such a drastic elimination of information would result in serious degradation of the received image. But, on the contrary, Applicant has discovered that by a suitable synthesis of this incomplete data, a quite acceptable good quality video image can be created (if the subject does not make sudden movements).

Applicant's new-found technique for accomplishing a suitable synthesis of the incomplete data is shown schematically in FIG. 3(b), wherein $F_1$* corresponds, in time sequence, to the original frame of video data $F_1$ (in FIG. 2), $F_2$* corresponds to $F_2$, and so on. The thus newly-interleaved (i.e. pseudo-interlaced) frames each have a full frame's worth of digital data, albeit not quite the original data. The human eye has difficulty, however, detecting any significant difference in the resulting displayed image vis-a-vis the image that would have resulted if the entire originally-available video data had been transmitted. It is not important whether the first half frame discarded is an even half frame or odd half frame, as long as from that point on the opposite type of half frame is discarded alternately in sequence. Hence, for example, $F_1$* could just as well be composed of $F_{12}$ combined with $F_{21}$, and $F_2$* could be composed of $F_{32}$ combined with $F_{21}$ and so on. The resulting displayed pseudo-interlaced video image would be substantially indistinguishable from the pseudo-interlaced image previously described above.

It is, of course, possible to carry this idea further by, for example, discarding two out of three lines in ordered sequence from each of the originally-available video data frames, and then synthesizing pseudo-interlaced frames from parts of three sequential originally-available frames in a manner similar to that described above. Or, alternatively, one could discard less than one half of the originally-available data (one-third or one-fourth, for instance) and similarly synthesize frames for display comprised of parts of two sequential originally-available frames. So Applicant's idea of pseudo-interlacing is not limited just to the "half and half" preferred embodiment described originally above, but rather extends to any like arrangement involving the discarding of lines (or columns) or partial-lines (or partial-columns) combined with subsequent systematic synthesis of a full video frame from the remaining data actually transmitted. The usefulness of any particular variation of Applicant's pseudo-interlacing invention herein described will be determined by the particular requirements of the practical application for which it is employed. Appropriate empirical testing may be needed to determine suitabilities for various applications, as will be apparent to those skilled in the digital video art area.

Figure 4:
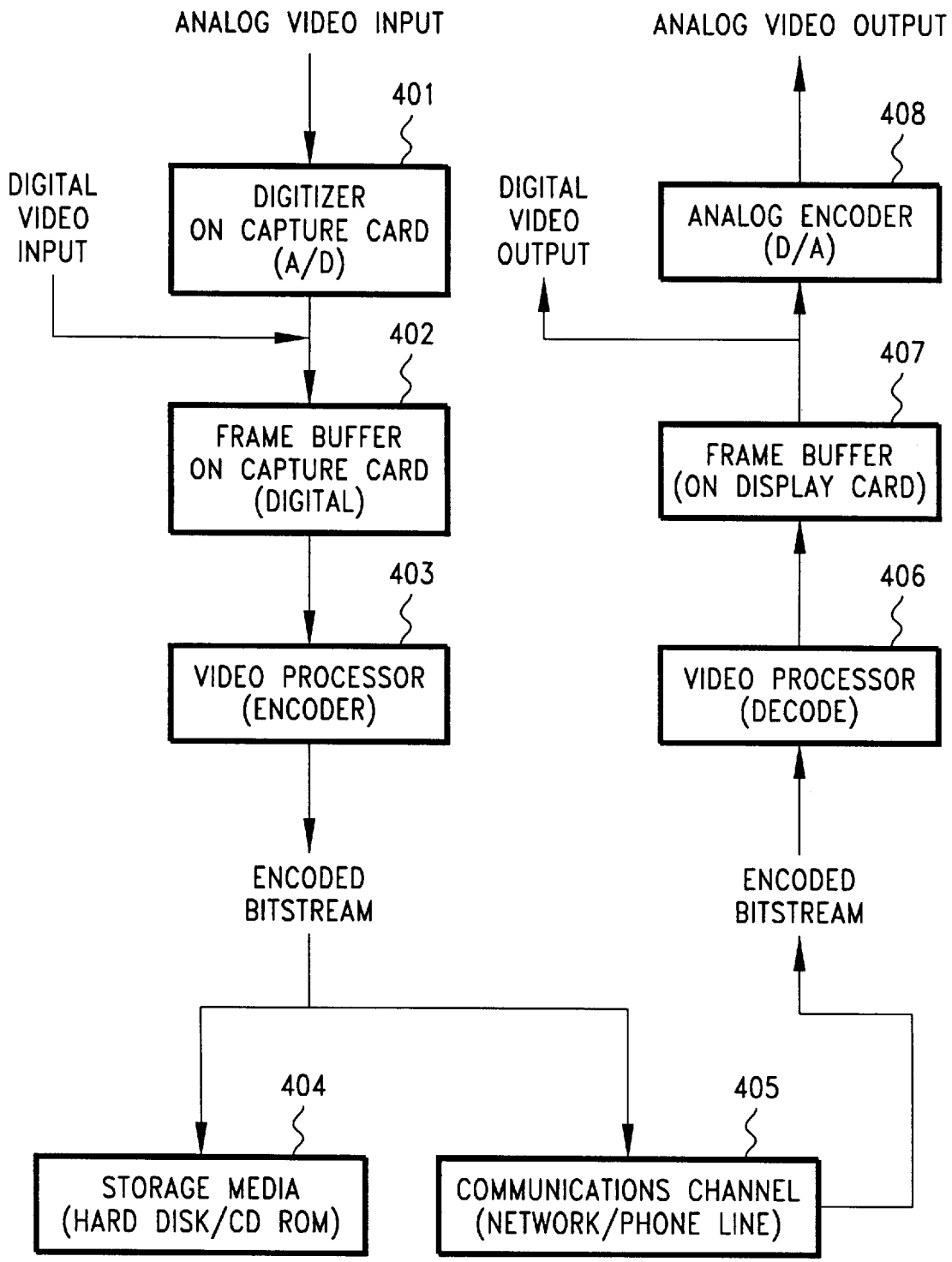
FIG. 4 is a system block diagram of apparatus suitable for implementing the invention.

Referring now to FIG. 4, therein depicted is a system block diagram that describes a typical digital video system within which the technique of the instant invention can be used. Therein, a frame buffer 402 receives full-frame digital video data either from a digitizer 401 or an alternate digital video source. Encoding video processor 403 receives sequential frames of digital video data and applies the pseudo-interlacing odd-half-frame-even-half-frame alternate discarding method described previously herein to the digital video data, and then sends the retained data as an encoded bit stream either to storage device 404 or along communications channel 405. The thus-encoded bitstream received at the opposite end of communications channel 405 is then directed to decoding video processor 406 which receives the encoded data and applies the full-frame pseudo-interlacing synthesizing technique described hereinabove to the received bitstream, creating a full-frame pseudo-interlace video data stream for application to the display frame buffer 407. The output of frame buffer 407 is then transmitted to a display or storage device (neither shown) capable of direct reception of sequential digital video frame data, or, alternatively, is transmitted to a digital-to-analog encoder that provides an analog video output for display on an analog display device (not shown).

Figure 5:
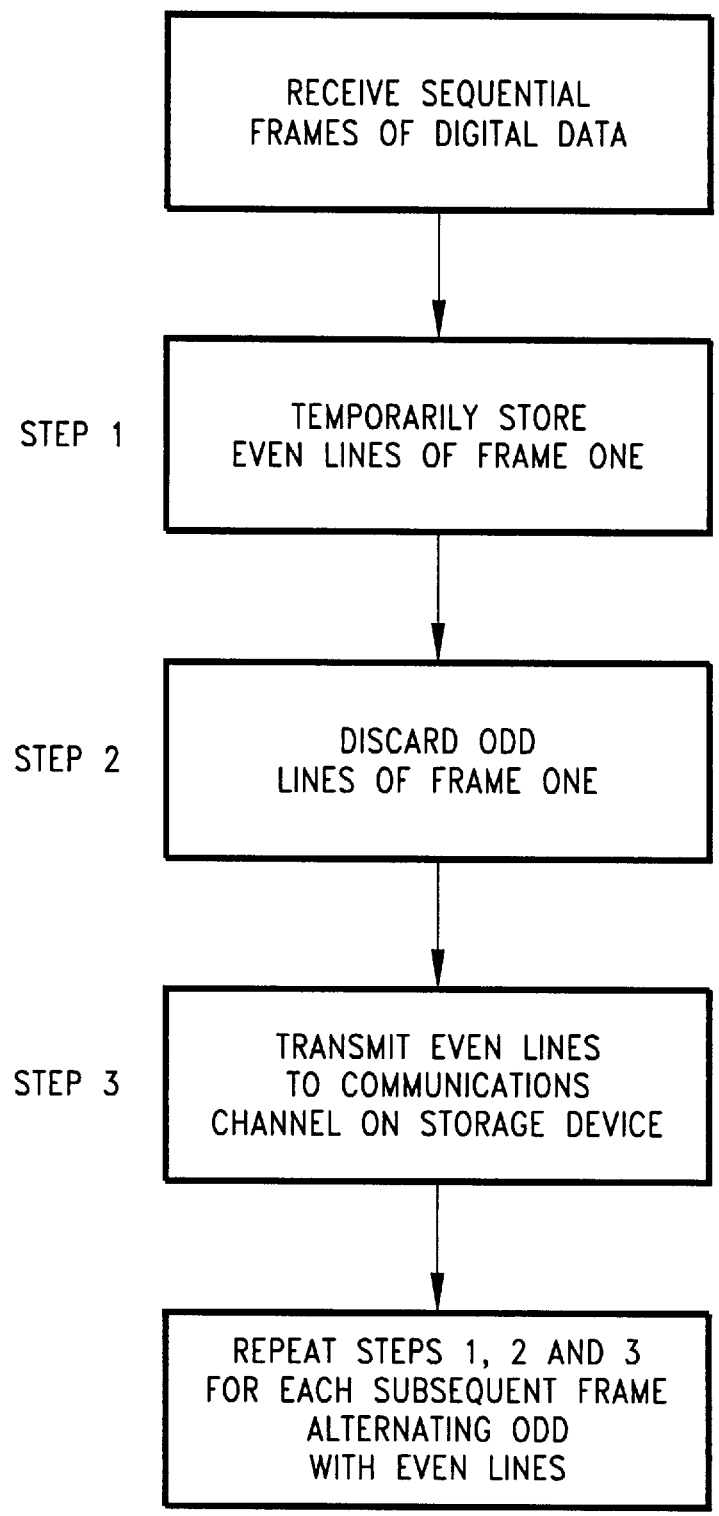
FIG. 5 depicts a flow chart for implementation of the "discarding" encoding technique of the instant invention.
Figure 6:
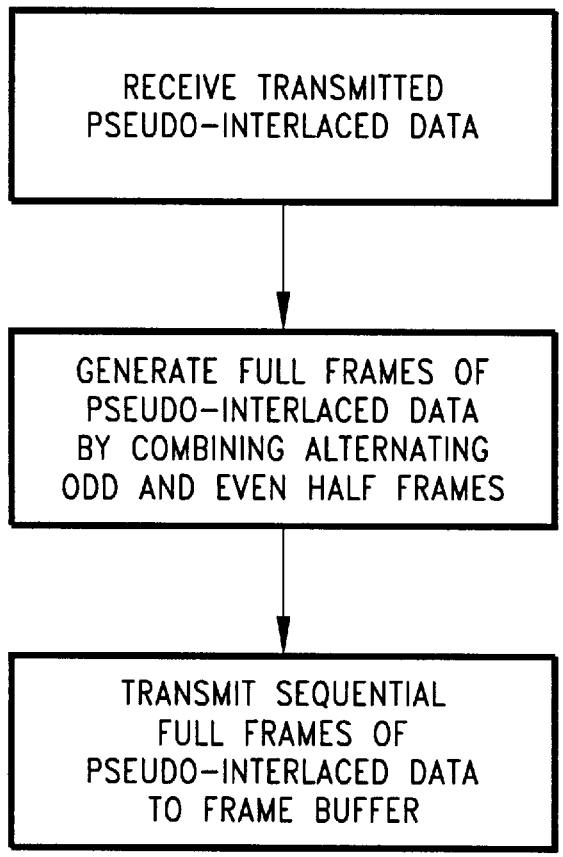
FIG. 6 depicts a flow chart for implementation of the pseudo-interlacing synthesis technique of this invention.

The encoding video processor 403 implements the alternating digital video data discard process described above and depicted in the flow diagram of FIG. 5. The decoding video processor 406 implements the generation of sequential full frames of pseudo-interlaced digital video data also as described above and depicted in the flow diagram of FIG. 6. Those skilled in the art of digital video processing will recognize that implementing these disclosed processes on any particular video processor is a simple matter of programming. It is to be understood that the instant invention is not limited in scope to the embodiments described above, but rather is defined by the appended claims and fair equivalents thereof.

What is claimed is:

1. A computer-implemented method, comprising the steps of:

(a) transmitting from an encoding node to a remote decoding node a sequential plurality of fields of digital video data, each field of the sequential plurality of fields corresponding to a portion of individual ones of a sequential plurality of video frames; and (b) repeatedly interleaving a current field of the sequential plurality of fields with at least an immediately preceding field, wherein each current field corresponds to a portion of a current video frame and each preceding field corresponds to a different portion of an immediately preceding video frame, to provide a series of pseudo-interlaced video frames.

2. The method of claim 1, further comprising the step of:

(c) storing with the encoding node the current and preceding fields.

3. The method of claim 1, wherein step (a) comprises the step of transmitting from the encoding node to the remote decoding node the series of pseudo-interlaced video frames.

4. The method of claim 1, wherein step (b) comprises the step of interleaving individual ones of the sequential plurality of fields with an immediately proceeding and immediately preceding field to provide the series of pseudo-interlaced video frames.

5. The method of claim 4, wherein the portions of the sequential video frames comprise a plurality of full horizontal lines of video.

6. The method of claim 5, wherein the plurality of full horizontal lines comprise every other line of video.

7. The method of claim 6, wherein the every other line of the sequential video frames alternate between being even lines and odd lines frame-to-frame.

8. The method of claim 1, further comprising the step of receiving, with the encoding node, the current and preceding video frames.

9. An apparatus, comprising:
  (a) an encoding node for transmitting to a remote decoding node a sequential plurality of fields of digital video data, each field of the sequential plurality of fields corresponding to a portion of individual ones of a sequential plurality of video frames; and
  (b) means for repeatedly interleaving a current field of the sequential plurality of fields with at least an immediately preceding field, wherein each current field corresponds to a portion of a current video frame and each preceding field corresponds to a different portion of an immediately preceding video frame, to provide a series of pseudo-interlaced video frames.

10. The apparatus of claim 9, wherein the encoding node comprises means for storing the current and preceding fields.

11. The apparatus of claim 9, wherein
  the encoding node comprises means for transmitting to the remote decoding node the series of pseudo-interlaced video frames.

12. The apparatus of claim 9, wherein
  means (b) comprises means for interleaving individual ones of the sequential plurality of fields with an immediately proceeding and immediately preceding field to provide the series of pseudo-interlaced video frames.

13. The apparatus of claim 12, wherein the portions of the sequential video frames comprise a plurality of full horizontal lines of video.

14. The apparatus of claim 13, wherein the plurality of full horizontal lines comprise every other line of video.

15. The apparatus of claim 14, wherein the every other line of the sequential video frames alternate between being even lines and odd lines from frame-to-frame.

16. The apparatus of claim 9, wherein the encoding node further comprises means for receiving the current and preceding video frames.

17. A computer-implemented method for decoding video images, comprising the steps of:
  (a) receiving a sequential plurality of fields of digital video data, each field of the sequential plurality of fields corresponding to a portion of individual ones of a sequential plurality of video frames; and
  (b) repeatedly interleaving a current field of the sequential plurality of fields with at least an immediately preceding field, wherein each current field corresponds to a portion of a current video frame and each preceding field corresponds to a different portion of an immediately preceding video frame, to provide a series of pseudo-interlaced video frames.

18. The method of claim 17, wherein
  step (b) comprises the step of interleaving individual ones of the sequential plurality of fields to provide the series of pseudo-interlaced video frames.

19. The method of claim 18, wherein the portions of the sequential video frames comprise a plurality of full horizontal lines of video.

20. The method of claim 19, wherein the plurality of full horizontal lines comprise every other line of video.

21. The method of claim 20, wherein the every other line of the sequential video frames alternate between being even lines and odd lines from frame-to-frame.

22. The method of claim 17, further comprising the steps of:
  (c) storing the series of pseudo-interlaced video frames; and
  (d) displaying the series of pseudo-interlaced video frames.

23. An apparatus for decoding video images, comprising:
  (a) means for receiving a sequential plurality of fields of digital video data, each field of the sequential plurality of fields corresponding to a portion of individual ones of a sequential plurality of video frames; and
  (b) means for repeatedly interleaving a current field of the sequential plurality of fields with at least an immediately preceding field, wherein each current field corresponds to a portion of a current video frame and each preceding field corresponds to a different portion of an immediately preceding video frame, to provide a series of pseudo-interlaced video frames.

24. The apparatus of claim 23, wherein
  means (b) comprises means for interleaving individual ones of the sequential plurality of fields to provide the series of pseudo-interlaced video frames.

25. The apparatus of claim 24, wherein the portions of the sequential video frames comprise a plurality of full horizontal lines of video.

26. The apparatus of claim 25, wherein the plurality of full horizontal lines comprise every other line of video.

* * * * *